Patented Dec. 31, 1940

2,226,548

UNITED STATES PATENT OFFICE 2,226,548

CATALYST REGENERATION

Robert E. Burk, Cleveland, Ohio, assignor to The Standard Oil Company, Cleveland, Ohio, a corporation of Ohio No Drawing. Application August 11, 1938,
Serial No. 224,415

15 Claims. (Cl. 23—238)

In the catalytic treatment of organic compounds where carbon-containing substances are among the raw materials, as for instance alcohols, hydrocarbons, etc., and catalysts such as oxides of chromium or equivalent are employed, the tendency is for the reaction to slow down too soon for profitable operation. In accordance with the present invention, however, it now becomes possible to maintain desirably effective action and in a manner affording convenient manufacturing operation.

To the accomplishment of the foregoing and related ends, the invention then comprises the features hereinafter fully described and particularly pointed out in the claims; the following description setting forth in detail certain illustrative embodiments of the invention, these being indicative, however, of but a few of the various ways in which the principle of the invention may be employed.

In proceeding in accordance with the invention I contact the materials to be converted, with a catalytic mass, for example certain oxides, and maintain the temperature in elevated range, for instance 375 to 675° C., until the rate of reaction as determined by the products coming off declines to a level predetermined as not profitable, whereupon the feed of material in the catalytic contact zone is stopped, and then a vacuum is applied to the catalytic zone, to draw out such residual material as may be so eliminated, a vacuum of the order of 25 to 29.5 inches of mercury, for instance, being desirable, and then there may be applied to the catalytic zone nitrogen, or in some instances another inert sweep-out gaseous agent such as carbon dioxide, or mixtures thereof, or in some instances steam or methane, etc. This subjection to vacuum and then a supply of inert gas may be repeated if desired. Following the application and withdrawal of the inert gas, a mixture of inert gas and air, or oxygen in proportions which may be variable, and e. g. with generally not over 5% of oxygen is admitted to the catalytic zone and is then withdrawn, as by vacuum, (or instead of air, oxygen may be admixed in some cases). In some cases in some steps, a diffusion-replacement of one gas by the succeeding gas may be effected. This breathing in and out of the mixture being repeated several times, whereupon air may then be introduced and be evacuated, or is breathed in and out of the catalytic material, until carbon dioxide substantially ceases in the effluent air, or in some cases to other predetermined oxidation level. In some instances the oxygen-containing gas may finally be allowed to remain in contact with the catalyst for a more extended time, or one may also use in the later stages of oxidation mixtures containing less oxygen than in the prior mixtures. During this treatment, the temperature has been maintained elevated, although not necessarily quite as high as for the direct reaction stage, and temperatures, for example, on the order of 400° C. are advantageous. After applying a vacuum and removing the air, hydrogen or like reducing atmosphere is in some instances introduced and the catalytic material at its elevated temperature is subjected to its action for a brief time. All of the steps are applied with some catalysts, while other catalysts allow omissions. The reaction raw material is then again turned on to the catalytic zone and the temperature being at sufficiently elevated level, the reaction is continued until the activity again declines to the predetermined level as above noted, whereupon the feed of reaction material is stopped, and the cycle of evacuation and breathing in and out of nitrogen, etc., is repeated as indicated. Thus, the various alcohols may be the raw material being operated, or in passing hydrocarbons, without or with air feed, over the catalytic mass, such material as n-hexane, n-heptane, n-octane, etc., can be employed, or instead of such relatively purified material, hydrocarbon fractions or distillates containing non-benzenoid hydrocarbons, as for instance in a boiling range of 60 to 215° C., from a stock such as Pennsylvania or Michigan petroleum may be employed, or in some instances hydrocarbons which are normally gaseous, as below the range of hexane. The raw material is fed through the catalyst arranged in a zone in exposure to heat, the temperature of the mass being maintained preferably around 50° C., or in general not under about 375° C. or over about 675° C. The pressure is desirably around atmospheric, or not in excess of about 200 pounds per square inch. The feed rate of the raw material, or the space-velocity, depends somewhat upon the operating temperature and pressure, for instance a ratio of two unit volumes of the liquid material per unit volume of the catalyst is suitable at 500° C. and 100 pounds per square inch, but it may be 0.5 or up to 6. The products passing from the catalytic zone may be extracted by a selective solvent, such as liquefied sulphur dioxide, or high boiling amine compounds and the like, 0.75–3 or somewhat more volumes of solvent being employed, and products undissolved by the solvent may be returned through the catalytic zone. As indicated, the catalyst may be of oxide character involving a plurality of oxides, one being from the group oxide of chromium, vanadium, titanium, tungsten and molybdenum and the other an oxide of such elements as aluminum, beryllium, titanium, arsenic, molybdenum, magnesium, silicon, lead, antimony, bismuth, barium, cadmium, zinc, calcium, cobalt, iron, uranium, tin, zirconium, boron, phosphorus, copper and tungsten. Some of these are preferably in certain relations, and thus a combination or compound catalyst made to provide oxide of chromium and an oxide from the group beryllium, aluminum, titanium, arsenic, molybdenum is desirable. Again, an oxide of chromium and of the group magnesium, aluminum and silicon, one or more. Again, an oxide of chromium, and of the group of elements of Periodic group 4, except carbon, germanium and hafnium. Again, oxide of chromium and an oxide capable of forming chromites, except Periodic group 1 metals. But the method is quite general and not limited to these oxides. Thus it may be applicable to sulphide catalysts, such as molybdenum sulphide. In this case it is necessary to resulphurize the catalyst after removing carbonaceous material by the present process.

In the passage of the carbon-containing material through such highly heated catalyst, it is of course difficult to determine just why the effectiveness of the reaction declines after several hours run such as to reach a point not profitable, but there is reason for believing that in a sense the pores of the gel structure of the catalyst become unduly obstructed, and by shutting off the feed of the hydrocarbonaceous material and carrying out the evacuating and breathing in and out the respective agents before the pore obstruction complete, as described foregoing, the activity is restored so as to facilitate the return of the feed, as seen, and thus the catalytic operation may be carried on at high level indefinitely. And since each evacuation and each application of treating gaseous agent need require only a short time, e. g. a few seconds or a fraction of a minute, the total breathing in and out operations can be rapid and the entire time therefor brief in the whole process. Catalysts of a character subject to thermal shock, or collapse in excessive oxidation can in this way be successfully operated and be maintained in service indefinitely.

Other modes of applying the principle of the invention may be employed, change being made as regards the details described, providing the features stated in any of the following claims, or the equivalent of such be employed.

I therefore particularly point out and distinctly claim as my invention:

1. In a process of organic-reaction catalyst regeneration, maintaining the temperature of the catalyst approximately at or somewhat below the reaction operating temperature, subjecting the catalytic material at least once to a vacuum and then to a supply of nitrogen, then breathing into and out of the catalyst a mixture of nitrogen and air, then repeatedly breathing air into and out of the catalyst until carbon dioxide substantially ceases, applying a vacuum, and then applying hydrogen to the catalyst mass.

2. In a process of organic-reaction catalyst regeneration, maintaining the temperature slightly lower than reaction operating temperature, subjecting the catalytic material at least once to a vacuum and then to a supply of inert gas, then breathing into and out of the catalyst a mixture of substantially nitrogen and air containing not over five per cent of oxygen and repeatedly breathing air into and out of the catalyst until carbon dioxide substantially ceases, and applying a vacuum to the catalyst mass.

3. In a process of organic-reaction catalyst regeneration, applying a vacuum, then an inert gas, then breathing into and out of the catalyst an inert gas containing not more than five per cent of oxygen, then repeatedly breathing air into and out of the catalyst until a predetermined oxidation level is attained, and evacuating air.

4. In a process of organic-reaction catalyst regeneration, subjecting the catalytic material at least once to a vacuum and then to a supply of non-oxidizing gas containing nitrogen, then breathing into and out of the catalyst a mixture of nitrogen and air, then repeatedly breathing air into and out of the catalyst until a predetermined oxidation level is attained, applying a vacuum, and then applying hydrogen.

5. In a process of organic-reaction catalyst regeneration, subjecting the catalytic material at least once to a vacuum and then to a supply of inert gas, then breathing into and out of the catalyst a mixture of inert gas and air, then repeatedly breathing air into and out of the catalyst until carbon dioxide substantially ceases, and applying a vacuum.

6. In a process of organic-reaction catalyst regeneration, subjecting the catalyst to the action of a vacuum, then supplying an inert gas, then breathing into and out of the catalyst an inert gas containing some air, then repeatedly breathing air into and out of the catalyst until a predetermined oxidation level is attained, and evacuating the air.

7. In a process of organic-reaction catalyst regeneration, subjecting the catalytic surface to the action in order of: vacuum, inert gas substantially free from air, vacuum, a mixture of inert gas and air, vacuum, air, vacuum, inert gas substantially free from air, vacuum, reducing atmosphere.

8. In a proceess of organic-reaction catalyst regeneration, subjecting the catalytic surface to the action in order of: inert gas substantially free from air, vacuum, a mixture of inert gas and air, vacuum, inert gas substantially free from air, vacuum, reducing atmosphere.

9. In a process of organic-reaction catalyst regeneration, subjecting the catalytic surface to the action in order of: a mixture of inert gas and air, vacuum, air, vacuum.

10. In a process of organic-reaction catalyst regeneration, subjecting the catalytic surface to the action in order of: a mixture of inert gas and air, vacuum, air, vacuum, reducing atmosphere.

11. In a process of organic-reaction catalyst regeneration, subjecting the catalytic surface to breathing in and out action in order of: vacuum, inert gas, inert gas containing a small amount of air, vacuum, air, vacuum, inert gas.

12. In a process of organic-reaction catalyst regeneration, subjecting the catalytic surface to breathing in and out action in order of: vacuum, inert gas, inert gas with a small amount of air, vacuum, air, vacuum.

13. In a process of organic-reaction catalyst regeneration, and subjecting the catalytic surface to breathing in and out action in order of: vacuum, inert gas, inert gas with a small amount of air, vacuum, inert gas.

14. In a process of organic-reaction catalyst regeneration, subjecting the catalytic surface a plurality of times to breathing in and out action of an inert gas with a small amount of air.

15. In a process of organic-reaction catalyst regeneration, subjecting the catalytic surface a plurality of times to breathing in and out action of air.

ROBERT E. BURK.